Patented Apr. 22, 1947

2,419,399

UNITED STATES PATENT OFFICE 2,419,399

FABRIC TREATING PASTE

Ernest Paul Hartsfield, Wilmington, Del., and Joseph Lester Richmond, Woodstown, N. J., assignors to E. I. du Pont de Nemours & Company, Wilmington, Del., a corporation of Delaware No Drawing. Application April 29, 1944,
Serial No. 533,398

5 Claims. (Cl. 252—8.8)

This invention relates to novel compositions of matter comprising quaternary ammonium compounds of the type useful as water-repellency agents, in paste form. More particularly, this invention deals with alcoholic pastes of quaternary ammonium compounds having a long-chain acylamido radical, and typified by stearamido-methyl-pyridinium chloride.

It is an object of this invention to improve the form and facilitate the practical handling of long chain quaternary-ammonium compounds of the type useful as water-repellency agents. A further object is to provide a stable paste-form of stearamido-methyl-pyridinium chloride, having good dispersibility on dilution with water. A still further object is to improve the economy of manufacture of water-repellents of the above type. Other and further important objects of this invention will appear as the description proceeds.

The long-chain acyl-amido-methyl-quaternary-ammonium compounds of the general formula

R—CO—NH—CH₂—N(tert)—X have long been recognized for their property of endowing textile fabric with water-repellency qualities when applied to same under certain conditions. In the above formula, R is an aliphatic radical of 10 or more carbon atoms, N(tert) stands for a tertiary amine, while X stands for an acid radical. See for instance, U. S. Patents Nos. 2,278,417; 2,146,392; 2,268,395 and 2,327,160. Outstanding among these compounds in view of its good qualities and economy is stearamido-methyl-pyridinium chloride, and the corresponding gamma-picolinium compound.

Hitherto these compounds have been isolated and marketed in dry form as powders, which required careful isolation and drying steps in the course of their manufacture. Also, in application, a certain degree of skill was necesary on the part of the consumer to get these powders dispersed in water to give uniform solutions.

It could be readily recognized that production of the said water-repellency agents in paste form would facilitate their use by the consumer, but no readily available method of producing such pastes was known heretofore. Obviously, greatest economy could be achieved only by the selection for the liquid phase of the paste a diluent which could also be employed as solvent or diluent during the synthesis of these water-repellents. Water, for instance, would not be suitable, because the synthesis of stearamido-methyl-pyridinium chloride from stearamido-methylol and pyridine hydrochloride or from stearamide, formaldehyde and pyridine hydrochloride in the presence of water does not result in a good quality product. On the other hand, organic solvents such as acetone, methyl-ethyl ketone and petroleum hydrocarbons do not give a paste of most desirable qualities as regards dispersibility in the aqueous treatment bath.

We have now found that lower aliphatic alcohols are suitable for use as a diluent or solvent in the synthesis and will produce stable pastes of quaternary-ammonium type water-repellents, and that the pastes thus produced possess excellent dispersibility qualities. Moreover, the resulting pastes have several unforeseen advantages; for instance the aqueous treatment bath does not foam so readily as when prepared by the use of dry quaternary-ammonium compound. A still more surprising effect is that the alcohol apparently stabilizes the reaction against small concentrations of water, as a result of which the alcohol, for instance isopropyl alcohol does not have to be employed in pure form, but may be employed instead in the form of a commercial, 90% solution in water. Likewise, concentrated aqueous hydrochloric acid may be employed in lieu of gaseous HCl.

As alcohols for this invention may be employed open-chain lower aliphatic alcohols or cyclic alcohols which are liquid at ordinary temperatures. As specific practical illustrations may be mentioned ethyl, propyl (normal and iso), butyl (normal, iso and tertiary), tertiary amyl, cyclohexyl, etc. Part of the alcohol, to an amount not exceeding 30% by weight, may be replaced by other organic solvents, for instance liquid petroleum hydrocarbons, acetone, methyl-ethyl-ketone, pyridine, etc. For highest economy, the alcohol is preferably employed as liquid medium in the synthesis of the quaternary compound, or at least in the final stage of such synthesis, for instance the step of reacting stearamido-methanol with pyridine hydrochloride.

Without limiting our invention, the following examples are given to illustrate our preferred mode of operation. Parts mentioned are by weight.

*Example 1.—Anhydrous isopropyl alcohol*

Dry hydrogen chloride gas is passed into a mixture of 12.5 parts of pyridine in 39 parts of anhydrous isopropyl alcohol until the reaction mixture shows acid to Congo Red paper. 1.5 parts of pyridine is added to the reaction mass (to neutralize the excess acid and have a slight excess of base). To this mixture is added 46.3 parts of methylol stearamide prepared as in U. S. P. 2,212,654. The temperature is raised to about 75° C. (±3° C.) to effect solution, and is held at this value for ½ to 2 hours to effect complete condensation. The material is allowed to cool to the crystallization point and then packed for sale.

When cotton cloth is dipped into a 2 to 6% water solution of the above paste and dried, followed by a heating to 125 to 175° C., the cloth acquires strong water repellent properties which are not removed or destroyed by ordinary washing or by commercial dry cleaning processes which consist in treatment with a solvent.

Example 2.—Anhydrous isopropyl alcohol 450 parts of stearamide, dissolved in 274 parts of isopropyl alcohol, are condensed at about 70° C., with 54 parts of para formaldehyde in the presence of a small amount of caustic potash. After about one hour, the formation of the methylol stearamide is complete. This product is then added to a suspension of gamma methyl-pyridine-hydrochloride, which has been prepared by diluting 171 parts of gamma methyl pyridine with 75 parts of isopropyl alcohol and neutralizing with gaseous hydrochloric acid and finally adding an excess of 34 parts of gamma methyl pyridine. The mixture of the methylol stearamide and gamma methyl-pyridine-hydrochloride is then heated to 68 to 72° C. for 1½ hours after which time the reaction is finished. On cooling, the solution congeals to a thick paste which dissolves in water to a somewhat turbid solution. When cotton is impregnated with a 3% solution of this product, dried and heated to 100 to 150° C. it acquires strong water repellent qualities, which are not destroyed by washing or extracting with dry cleaning agents.

Example 3.—90% isopropyl alcohol 11 parts of pyridine is gassed with dry hydrogen chloride in 38.5 parts of 90% isopropyl alcohol. On completion of the gassing, 4.5 parts of pyridine and 46 parts of methylol stearamide are added. The temperature is raised to about 75° C. at which point it is held until the condensation is complete. The charge is allowed to cool to the point of crystallization and then packed.

Example 4.—Aqueous hydrochloric acid 34.8 parts of 90% isopropyl alcohol, 13.1 parts of pyridine and 12 parts of 36% hydrochloric acid are mixed. To this is added 40.1 parts of methylol stearamide. The temperature is raised to about 75° C. and held until condensation is complete. After cooling to effect crystallization, the charge is packed for shipment.

Example 5.—Denatured 95% ethyl alcohol 11.5 parts of pyridine is gassed with dry hydrogen chloride in 39.4 parts of denatured ethyl alcohol. After completion of the gassing, 3.6 parts of pyridine and 46 parts of methylol stearamide are added. The temperature is raised to 75° C. and held until condensation is complete. After cooling to the crystallization point, the charge is packed.

Example 6.—n-Butyl alcohol 10.9 parts of pyridine is gassed with dry hydrogen chloride in 38.6 parts of n-butyl alcohol. On completion of the gassing, 5.5 parts of pyridine and 45.1 parts of methylol stearamide are added. The temperature is raised to about 75° C. and held until condensation is complete. The charge is isolated as in Example 1.

Example 7.—Tertiary amyl alcohol 11 parts of pyridine is gassed with anhydrous hydrogen chloride in 39 parts of tertiary amyl alcohol. On completion of the gassing, 4.3 parts of pyridine and 45.7 parts of methylol stearamide are added. The charge is heated to about 75° C. and held until condensation is complete. It is finished as in Example 1.

Example 8.—Cyclohexanol 11.1 parts of pyridine is gassed with dry hydrogen chloride in 39.5 parts of cyclohexanol. On completion of the gassing, 3.1 parts of pyridine and 46.3 parts of methylol stearamide are added. The temperature is raised to about 75° C. and held until condensation is complete. The reaction product is isolated as in the previous examples.

It will be understood that the above examples are merely illustrative, and are not intended to limit this invention. Thus, as source of long-chain acyl-amide, methylol amides made from fatty acids other than stearic may be used. The methylol stearamide used in the previous examples was derived from a mixture of palmitic and stearic acid. Satisfactory products may be prepared from pure stearic, palmitic, myristic acids, etc., and mixtures thereof. As has been mentioned in one of the examples, aqueous hydrochloric acid may be used in preparing the pyridinium salt. Other acids may also be used in this step in preparing pyridinium compounds. (See for instance U. S. Patents Nos. 2,146,392 and 2,146,408).

The paste products, as described in the examples, contain approximately 45 to 50% active ingredient. Paste products of varying active ingredient contents, say from 40 to 65%, may be formed in like manner, by varying the amount of solvent employed in the process. On the other hand, higher quantities of the alcohol may be employed in the synthesis and then part of it removed by distillation before the paste is cooled.

The specified temperature range of 75±3° C. is not an absolute qualification. It has been found that at this temperature the solution of the reactants takes place readily and a minimum amount of by-products are formed. Other temperature ranges, however, may be employed if found convenient.

Quaternary salts, other than pyridine hydrochloride which react in this system to give corresponding products may also be manufactured in a paste form. Quinoline, trimethylamine and picoline are some of the bases indicated in the art.

The final product may be drummed prior to crystallization, i. e., on completion of the condensation.

The advantages of our invention will now be readily apparent. To begin with, we find that in producing water repellents in paste form according to this invention, their dispersibility greatly exceeds that of any similar dry products. Then, by manufacturing the material in this paste form, we have eliminated the filtration, drying, mixing and grinding operations now employed in producing the product in the dry form. Again, the pastes of this invention are much easier to apply in the textile mills on a commercial scale, because they have less tendency to foam. Finally, by combining the incorporation of the alcohol with the process of synthesis, employing the alcohol itself as a medium for reaction, we eliminate solvent losses which otherwise occur when the quaternary compound has to be isolated in dry form from the solvent.

We claim:

1. A composition of matter comprising a long-chain acylamido-methylene-quaternary-ammonium chloride in paste form, the liquid phase being essentially an alcohol which is liquid at room temperature and the concentration of the chloride in the paste being at least 40% by weight of the entire composition.

2. A composition of matter comprising stearamido-methyl-pyridinium chloride dispersed in a liquid medium consisting essentially of an alcohol which is liquid at room temperature, the concentration of the chloride being at least 40% by weight of the entire composition, whereby to give the entire composition the consistency of a paste.

3. As an article of commerce a paste of stearamido-methyl-pyridinium chloride in a liquid medium consisting predominantly of isopropyl alcohol, the concentration of the chloride in the paste being at least 40% by weight.

4. As an article of commerce a paste of stearamido-methyl-pyridinium chloride in a liquid medium consisting predominantly of isopropyl alcohol, the concentration of the chloride in the paste being between 40 and 65% by weight.

5. As an article of commerce a paste of stearamido-methyl-pyridinium chloride in a liquid medium consisting predominantly of ethyl alcohol, the concentration of the chloride in the paste being at least 40% by weight.

ERNEST PAUL HARTSFIELD.
JOSEPH LESTER RICHMOND.

REFERENCES CITED

The following references are of record in the file of this patent:

UNITED STATES PATENTS

| Number | Name | Date |
| --- | --- | --- |
| 1,952,008 | Bruson | Mar. 20, 1934 |
| 2,291,519 | Wirth | July 28, 1942 |
| 2,146,392 | Baldwin | Feb. 7, 1939 |
| 2,131,362 | Baldwin | Sept. 27, 1938 |
| 2,189,648 | Guenther | Feb. 6, 1940 |
| 2,369,776 | Cusa et al. | Feb. 20, 1945 |
| 2,146,408 | Shipp | Feb. 7, 1939 |